United States Patent
Lei et al.

(10) Patent No.: US 11,750,393 B2
(45) Date of Patent: Sep. 5, 2023

(54) SECURE BROADCAST DELIVERY AND VERIFICATION

(71) Applicant: FORD GLOBAL TECHNOLOGIES, LLC, Dearborn, MI (US)

(72) Inventors: Oliver Lei, Windsor (CA); Vladyslav Slyusar, Northville, MI (US); Jayanthi Rao, West Bloomfield, MI (US); Somak Datta Gupta, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 17/216,927

(22) Filed: Mar. 30, 2021

(65) Prior Publication Data
US 2022/0321352 A1 Oct. 6, 2022

(51) Int. Cl.
*H04L 29/06* (2006.01)
*H04L 9/32* (2006.01)
*H04W 4/44* (2018.01)

(52) U.S. Cl.
CPC ............ *H04L 9/3236* (2013.01); *H04W 4/44* (2018.02); *H04L 2209/80* (2013.01); *H04L 2209/84* (2013.01)

(58) Field of Classification Search
CPC ............... H04L 9/3236; H04L 2209/80; H04L 2209/84; H04W 4/44
See application file for complete search history.

(56) References Cited

U.S. PATENT DOCUMENTS

| | | | |
|---|---|---|---|
| 8,667,291 B2 * | 3/2014 | Nonaka | G06F 21/64 713/176 |
| 8,892,686 B1 * | 11/2014 | Thibeault | H04L 67/5651 709/219 |
| 9,980,014 B2 | 5/2018 | Fay et al. | |
| 10,091,551 B2 * | 10/2018 | Malik | H04N 21/2668 |
| 10,524,015 B2 * | 12/2019 | Kits van Heyningen | H04N 21/6143 |
| 10,716,021 B1 * | 7/2020 | Peden | H04L 9/0643 |

(Continued)

OTHER PUBLICATIONS

Christidis et al., Blockchains and Smart Contracts for the Internet of Things; May 10, 2016; IEEE Access, p. 2292-2303 (Year: 2016).*

*Primary Examiner* — Taghi T Arani
*Assistant Examiner* — Lin Chang
(74) *Attorney, Agent, or Firm* — Joseph Zane; Brooks Kushman P.C.

(57) ABSTRACT

A vehicle receives a first portion of content via ATSC broadcast, generates a random nonce, responsive to receiving the content, and sends the nonce and a request for content verification to a remote server. The vehicle receives a message from the remote server indicating whether the first portion of content is likely valid, the message including a second portion of content and a hash value when the content is likely valid. The vehicle then calculates a second hash value, using the random nonce and the first portion of content. The vehicle compares the second hash value to the first hash value, and responsive to the second hash value matching the first hash value, combines the second portion of content and the first portion of content to create combined content. The vehicle then uses a security strategy to convert the combined content into utilizable content, and utilizes the content.

16 Claims, 6 Drawing Sheets

(56) References Cited

U.S. PATENT DOCUMENTS

| | | | |
|---|---|---|---|
| 2004/0009815 A1* | 1/2004 | Zotto | A63F 13/77 |
| | | | 463/42 |
| 2006/0085644 A1* | 4/2006 | Isozaki | H04L 9/0891 |
| | | | 713/171 |
| 2008/0062870 A1* | 3/2008 | Glower | H04L 67/1063 |
| | | | 370/230 |
| 2011/0271306 A1* | 11/2011 | Kahn | H04N 21/631 |
| | | | 725/91 |
| 2013/0104247 A1* | 4/2013 | Cakulev | H04L 63/12 |
| | | | 726/29 |
| 2015/0200944 A1* | 7/2015 | Zhang | H04N 21/258 |
| | | | 726/4 |
| 2016/0360280 A1* | 12/2016 | Kits Van Heyningen | |
| | | | H04N 21/41422 |
| 2018/0167304 A1* | 6/2018 | Crowder | H04L 9/3226 |
| 2019/0155995 A1* | 5/2019 | Bangole | H04W 12/041 |
| 2019/0190703 A1 | 6/2019 | Lekkas | |
| 2020/0228870 A1* | 7/2020 | Gordon | H04N 21/44008 |
| 2021/0406893 A1* | 12/2021 | Calvert | G06Q 20/0855 |

* cited by examiner

SECURE BROADCAST DELIVERY AND VERIFICATION

TECHNICAL FIELD

The illustrative embodiments relate to methods and apparatuses for secure broadcast content delivery and verification.

BACKGROUND

In a first illustrative embodiment, a system includes a processor configured to receive a first portion of content via an ATSC broadcast. The processor is further configured to generate a random nonce, responsive to receiving the content, and send the nonce and a request for content verification to a remote server. Also, the processor is configured to receive a message from the remote server indicating whether the first portion of content is likely valid, the message including a second portion of content and a hash value when the message indicates that the content is likely valid.

Responsive to the message indicating that the content is likely valid, the processor is configured to calculate a second hash value, using the random nonce and the first portion of content as inputs to a hashing function. The processor is configured to compare the second hash value to the first hash value, and responsive to the second hash value matching the first hash value, combine the second portion of content and the first portion of content to create combined content. The processor is additionally configured to utilize a security strategy to convert the combined content into utilizable content and utilize the utilizable content.

In a second illustrative embodiment, a system includes a processor configured to reconfigure deliverable vehicle content according to a security strategy to derive reconfigured content. The processor is also configured to divide the reconfigured content into a first and second portion and send the first portion to an ATSC broadcast station. The processor is additionally configured to receive a verification request from a vehicle to verify receipt of the first portion at the vehicle, the request including a nonce generated by the vehicle. The processor is configured to verify whether the vehicle was designated for content receipt and, responsive to the vehicle being designated for content receipt, generate a hash value using the first portion of the reconfigured content and the nonce. The processor is also configured to send the hash value and the second portion of content to the vehicle in response to the verification request.

In a third illustrative embodiment, a system includes a server, including one or more server processors and in communication with a vehicle and a vehicle, including one or more vehicle processors. The vehicle processor is configured to receive a first portion of content via ATSC broadcast, generate a random nonce and send a verification request to the server including the nonce.

The server processor is configured to receive the verification request from the vehicle processor, confirm that the vehicle, identified by the verification request, was intended to receive the first portion of content, and, responsive to confirming that the vehicle was intended to receive the first portion of content, generate a first hash value using the nonce and the first portion of content. The server is also configured to respond to the verification request with the first hash value and a second portion of content.

The vehicle processor is further configured to receive a server response including the first hash value and second portion of content. The processor is also, responsive to the server response, configured to generate a second hash value using the nonce and the received first portion of content. The vehicle processor is configured to compare the first and second hash values, and, responsive to the hash values matching, combine the first and second portions of the content to resolve combined content. The vehicle processor is further configured to utilize the combined content in accordance with instructions included in the combined content.

SUMMARY

Connected vehicles have the capability to both send and receive data. In many instances, this is achieved via a direct one-to-one connection, where a vehicle establishes a connection with a remote server and receives or sends useful data (map update, software update, etc.). In instances where the connection is facilitated using cellular services, for example, this can incur a high data cost in the aggregate when a distributor of the data (e.g., an Original Equipment Manufacturer (OEM)), has to send the data to a large number of vehicles.

Advanced Television System Committee (ATSC) 3.0 technology allows for using a TV frequency to broadcast data and then various vehicles or other entities can receive the data as part of a broadcast. This provides a one-to-many opportunity, but typically does not involve intended direct communication with a single entity. That is, the information is part of a broadcast, and then the receiving entities must receive and process the data included in the broadcast, when the data may not have been intended for a given receiving entity or may be non-applicable to that entity.

Because ATSC can be used to broadcast data, it is a useful communication medium for delivering large amounts of data at a much lower cost than individual transmission to a plurality of entities within a given broadcast range, especially if many of those entities need the same data. But, when the entities are vehicles, such as in the illustrative embodiments herein, there is an increased concern about verifying the content of the broadcast as authentic. Because there is not two-way communication, a receiving entity cannot perform traditional source-verification through handshakes and the like, and instead may simply receive a packet over an ATSC receiver, where the packet purports to be from a verified source, but where the vehicle does not actually know the origin of the packet.

In addition, because the broadcast is not recipient designated in a manner that prevents receipt from an unintended third party (e.g., while it may be possible to tell known receiving vehicles to ignore a broadcast lacking certain vehicle identifiers, it is harder, if not impossible, to prevent someone using an ATSC receiver and within range from receiving the broadcast and doing with it what they will). This can create an issue for an OEM because unsecured broadcast of a vehicle software update received by a third party with malicious intent, may be usable to reverse engineer some aspects of vehicle software, exposing the vehicle or code to attack.

So, while ATSC remains a viable medium for content broadcast, and a very cost-effective one, the nature of the transmission and general availability of the transmission mean that new methods of security are needed to protect one or both of the receiving source from unauthorized data and the transmitting entity from data misuse.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Using a server in conjunction with ATSC television stations, a broadcasting entity (e.g., OEM) can prepare and send targeted data designed to reach multiple vehicles within a station's broadcast range, in a one-to-many fashion. That is, instead of delivering the data to each vehicle individually via a direct connection with a given vehicle, the entity can prepare data that is useful for a designated group of vehicles and send the data and instructions to broadcast to an ATSC station. The station can then send the ATSC broadcast and a large number of vehicles can receive the data at the same time.

Since the data may only be applicable or relevant to a subset of receiving vehicles, the server can also prepare information indicative of the vehicles to which the data applies. For example, if the data relates to a road anomaly, the server can designate a coordinate range around the anomaly, or a time of day when the anomaly is applicable, etc. If the data relates to a software update, the server can designate a software version, or even specific range of vehicle identification number (VIN) or electronic serial number (ESN) elements.

When a vehicle receives the broadcast, it can check parameter data associated with the broadcast to determine the applicability of the data contained in the broadcast. If the parameter data indicates that the vehicle can use the broadcast data, then the vehicle can process the broadcast or send it to the proper internal system (update process, nav system, etc.) for handling.

While this is a suitable solution for receiving the software and handling receipt, as well as deciding which vehicles should receive which data, there remain concerns about data verification and the data falling into the wrong hands.

The illustrative embodiments address these concerns through two exemplary techniques (and or variants thereof that are within the scope of the invention) that can be combined or used individually to achieve enhanced assurances of at least one of data-validity and/or intended-recipient usage only.

In general terms, the vehicle can request verification of data from a server without having to retransmit all the data to the server, reducing data overhead for direct communication, and the server can transmit a large portion of data as a broadcast packet and reserve a small portion, but one that is usable to complete a data set, for direct transmission when the vehicle requests verification (or at some other suitable time).

Figure 1:
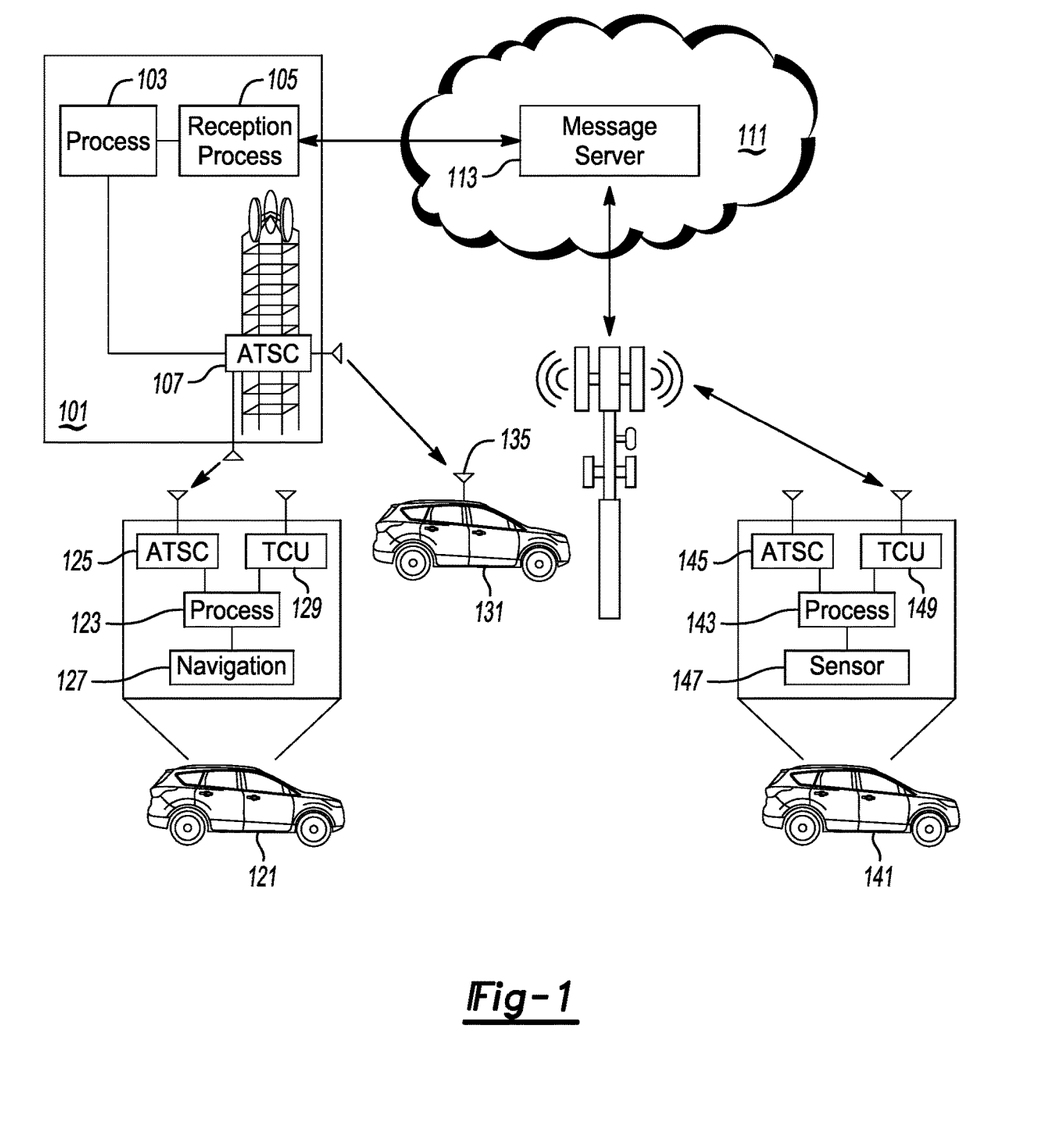
FIG. 1 shows an illustrative example of a general ATSC broadcast system usable to deliver vehicle software packages.

FIG. 1 shows an illustrative ATSC system 101 in communication with a cloud 111 server 113 and multiple vehicles 121, 131, 141. In this example, the ATSC system 101 is an ATSC television station, capable of sending ATSC broadcasts to a known broadcast area. The station includes some form of process 105 for receiving updates, which is commonly connected to a wide area network (e.g., the Internet), but which also may utilize a cellular or other connection. Through the process 105, the station 101 receives instructions from the cloud 111 server 113 and processes those instructions to devise a broadcast, at station computer equipped with a processor 103. Once the broadcast is ready, the processor 103 can instruct the ATSC transceiver 107 to send out the broadcast to any vehicles 121, 131, 141 within a reception area.

In the example shown, any one of the vehicles 121, 131, 141 may require or benefit from an update from the cloud 111 server 113. In some instances, such as vehicle 141, the vehicle may include a sensor suite 147. It can be costly and time consuming to update each vehicle individually, At the same time, using ATSC to broadcast an entire update, whole form, may be convenient, but may present a security risk, if unintended parties receive the update. Thus, in the examples, the ATSC broadcast may be a portion of an update.

In other instances, the vehicle may be a human-driven vehicle 121, 131, and may include a processor 123, an ATSC tuner 125, a navigation process 127 and other onboard processes, and a telematics control unit (TCU) 129.

The server 113 may package delivery instructions, along with any parameters usable by vehicles 121, 131, 141 to determine if a received broadcast is applicable, and then the server 113 delivers the data package to the station 101. The station 101 can then send the data package to the various vehicles 121, 131, 141, which can individually determine the applicability of the data. For example, certain vehicles may not need the update, or may have already implemented it.

Vehicles receiving the broadcast portion of the update may then communicate directly with the server 113 to receive the completed version of the update allowing the vehicle to complete and utilize the update file as described herein and/or in similar manners.

Figure 2:
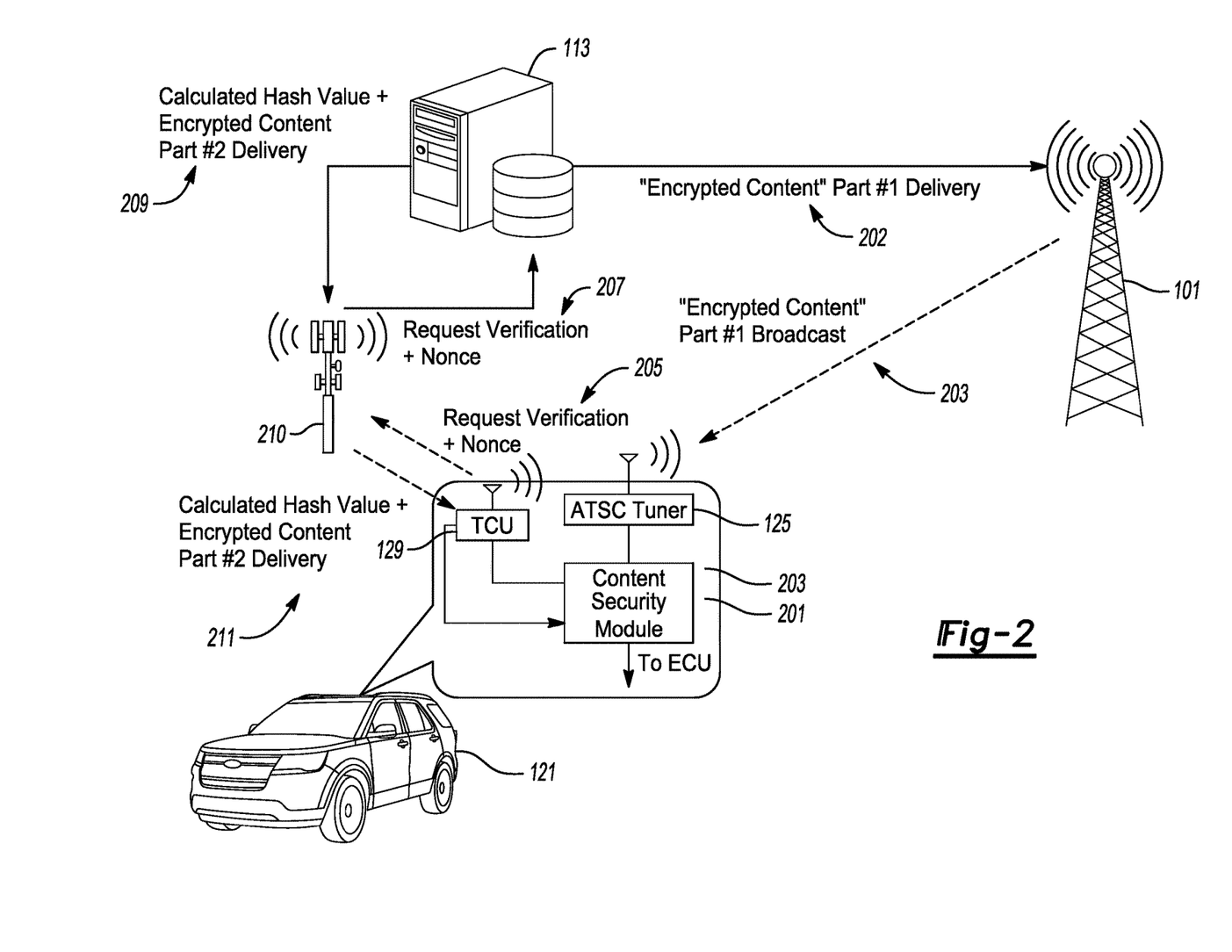
FIG. 2 shows an illustrative example of an ASTC data verification system.

FIG. 2 shows an illustrative example of an ASTC data verification system. In this example, the vehicle 121 includes an ATSC tuner 125 and a TCU 129. The vehicle 121 also includes a verification process 201, which communicates with an OEM server 113 via cellular network 210 or through other direct communication mediums allowing for two-way communication.

The vehicle 121 receives a broadcast 203 from the ATSC transmitter 101, and the content security module 201 or similar process attempts to verify the validity of the received data. In this example, the module 201 uses the TCU 129 to send a verification message through the cellular network 210 to the server 113. The server 113 verifies the validity of the data based on the received request and sends back a verification response 209 over the cellular network 210, which passes the verification response 211 to the vehicle 121. There, it is received and processed by the vehicle module 201.

In this example, several illustrative actions occur that serve to provide examples of how security and verification of messages and data under such systems can be achieved. For example, the server 113 splits the data content into at least two parts and sends part 1 (the larger part) 202 to the ATSC station 101 for broadcast. The second part of the data, needed in this example to complete the data, is sent via direct communication when the server 113 responds to the verification request, although it could be sent at other times as well.

Additionally, the vehicle 121 process 210 can use the received data and a random nonce to request verification, and the server can respond with a hash that can be checked by the vehicle for validity of response (as opposed to the server simply responding that the data is valid, which may be an easier response to spoof). The response, in this example, also includes the additional data elements of the set resulting from the split, which can be reassembled with the larger set in part 1, at the vehicle, providing a complete and validate version of the software or update.

For example, for valid content, both the server and the vehicle have the following common knowledge: 1) the content of the part 1 of the data; 2) the random nonce (since the vehicle sends this to the server with the validity request); and 3) the VIN of the vehicle. So if the server uses its version of part 1, plus the nonce, plus the VIN to calculate a hash, the vehicle, having access to all three elements (assuming the content at the vehicle is valid) can determine the same hash and a match will verify the data.

Simply because there is not a match does not mean that the data was not OEM originated, but transmission interruption and interference may result in packet-loss, which is an issue that can be addressed through various solutions. If over-large data broadcasts were resulting in significant failure-to-complete, the server could also break the data into multiple part 1's for broadcast, and the vehicle could verify each as received, and complete the data once it received the complete data set. While this may take more iterations of broadcast, it is just an example of an alternative approach that does not significantly vary from the verification (which can still be achieved with each part 1 received) and/or completion of data from the server. The server may also assign a sequence number for each part 1 and set the total number of part 1s in each part 1. Thus, the vehicle will know if it receives all supposed part 1s. If yes, the vehicle starts next verification step. If not, the vehicle may simply wait for missing part 1s in next round of broadcast or decide to request the missing part 1s from the server and use received part 1s for next verification step.

As noted, the server 113 may break content into one or more larger pieces for transmission through ATSC, and yet retain a sufficient portion of content (e.g., random or strategic portions) such that receiving the main content from the ATSC broadcast without the additional content from the server is not enough to utilize or decode the content.

Figure 3:
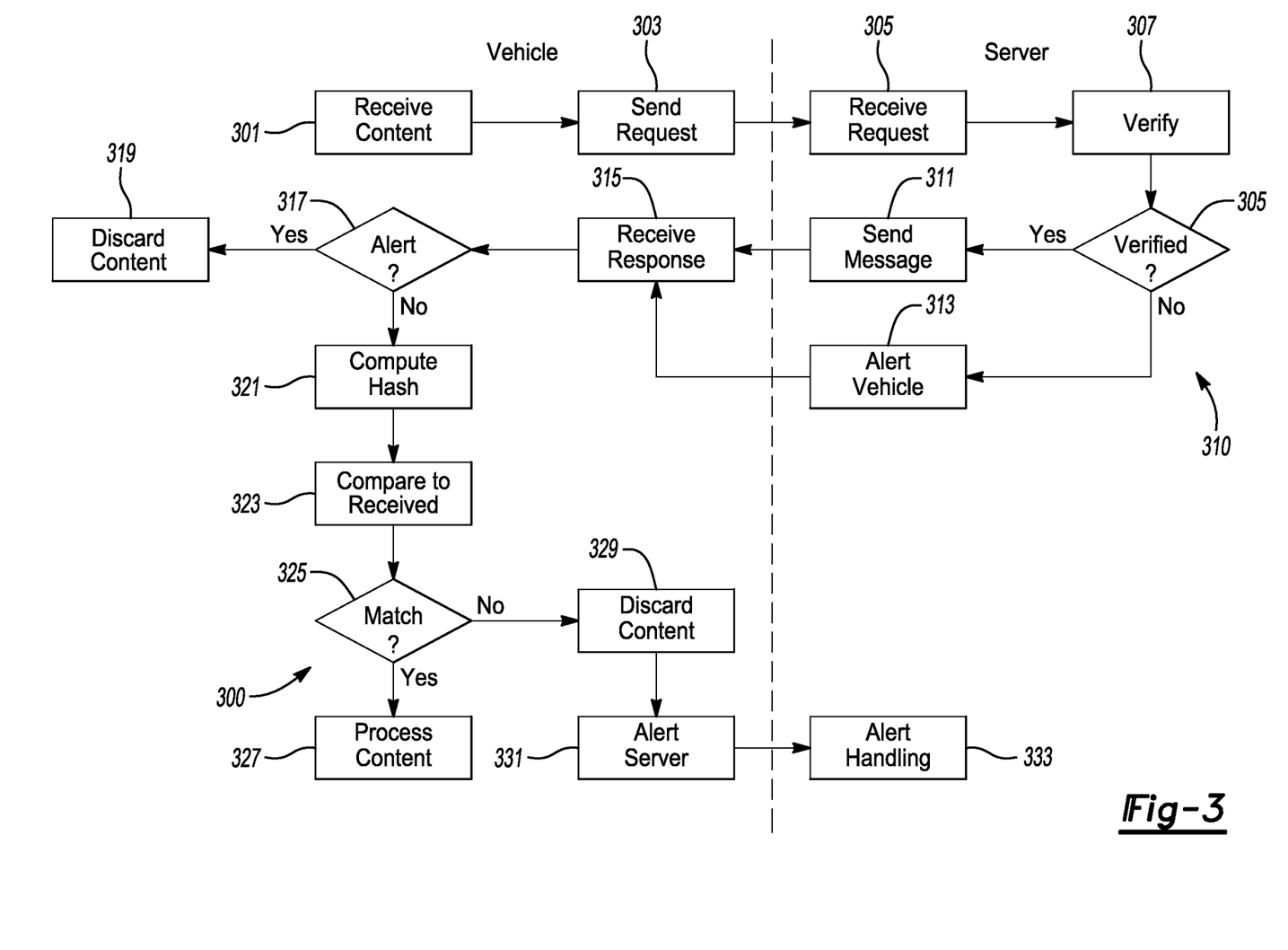
FIG. 3 shows an illustrative overall transmission and verification process.

FIG. 3 shows an illustrative overall transmission and verification process. In this example, the ATSC broadcast station 101 sends out the larger portion of content (one large portion will be used for examples throughout, illustratively). The vehicle 121 receives the content at 301, and sends a request at 303 to the server 113, for example, from the security module 201. This request serves two purposes in this example, it asks for verification of the received content (e.g., that it actually was sent by the OEM) and it provides an opportunity for the OEM server 113 to return not only verification, but also the missing smaller portion of the completed content.

Figure 5:
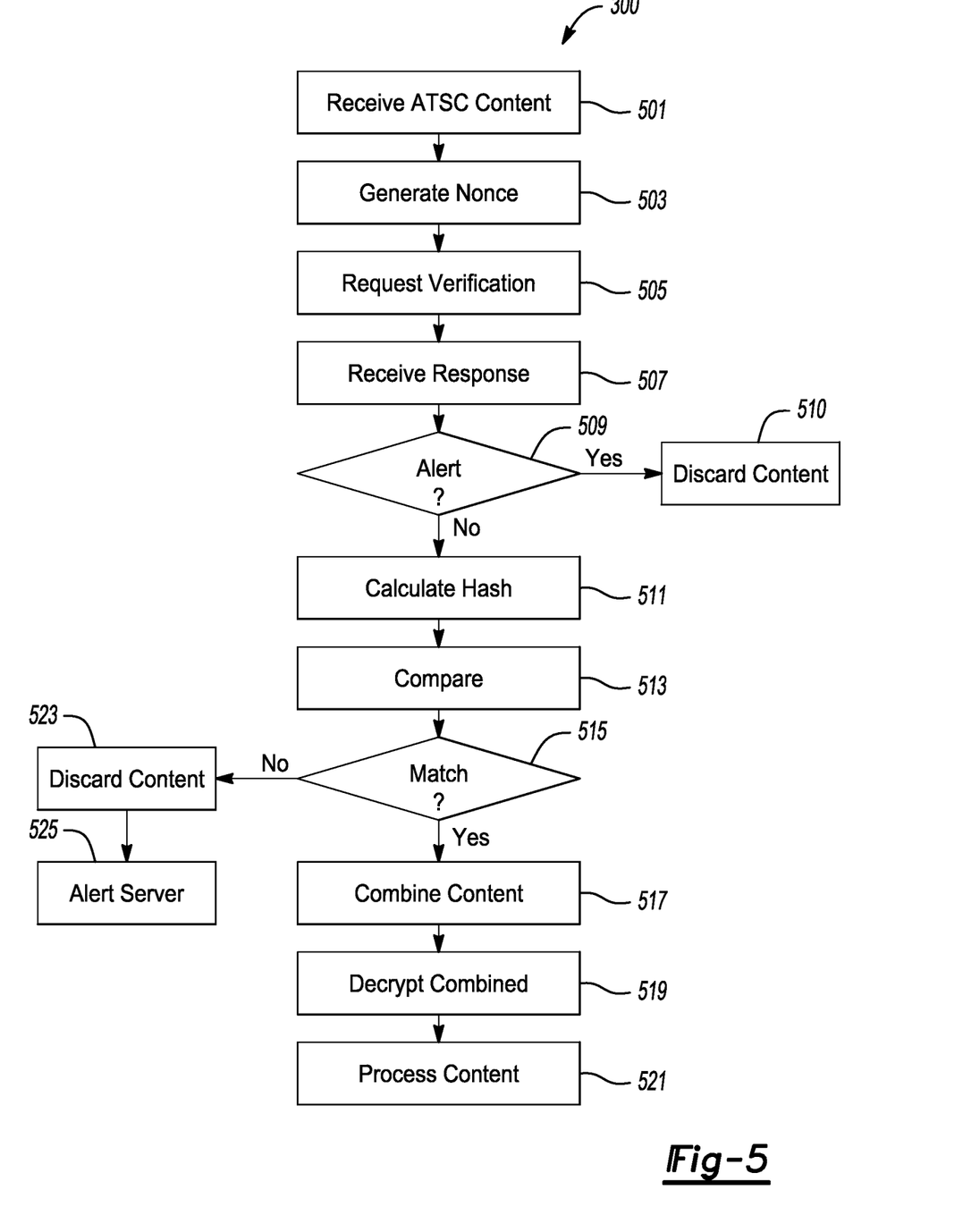
FIG. 5 shows an illustrative vehicle-side verification request process.

In this example, as is described in greater detail in FIG. 5, the vehicle 121 generates a random nonce and requests that the server verify the content part received, which includes sending the nonce to the server 113. The server 113 receives the request at 305 and confirms that there is content that was transmitted to the vehicle 121. While the server 113 does not specifically know that the content was sent to that vehicle 121 because the content was broadcast via ATSC, the server 113 knows whether there was supposed to be broadcast ATSC content, and so if the request for verification comes when there is no content that has been sent, then the server 113 knows that the content is not valid. If the vehicle 121 is supposed to have received content (which can include, for example, verifying some form of content identifier sent from the vehicle 121, which may be useful in the event that there are multiple possible content sets outstanding), then the server can use the content to generate a checksum/hash for the vehicle 121 to verify to ensure the received content is both the correct content and is complete.

The server can use the nonce and the vehicle 121 vehicle identification number (VIN) to create a hash, along with using the content, once the server 113 confirms that the content is presumably valid at 309. This can be sent as a message back to the vehicle 121 at 311, along with the missing portion of content held in reserve by the server 113. If the vehicle 121 is not supposed to have received any content, the server 113 can alert the vehicle at 313, which can cause the vehicle 121 to discard the content.

The vehicle 121 receives a response from the server 113 at 315, and determines if the response included an alert at 317. If there is an alert, the vehicle 121 discards the content as invalid content at 319. Otherwise, the vehicle 121 computes its own version of the hash, using the same components as the server (e.g., VIN, nonce, content part 1) at 321. This hash value is compared to the value received from the server, and if the content is complete (i.e. not missing blocks) and valid then this should match. "Complete" here means that the whole part 1 was received, so that the vehicle 121 holds a comparable part 1 to that stored in the server 113, and in this way the check can serve as a verification that the whole part 1 was received, because if the content includes errors, the hash will come out different than that generated by the server, even if the vehicle 121 is otherwise supposed to have the content.

If there is not a match at 325, the vehicle 121 can discard the content at 329 or take other remediating action. The server can also take remediation steps, as the vehicle 121 may alert the server 113 at 331 that the content block was invalid for some reason. The server 113 may include an alert handling process that can determine if the content should be transmitted directly, queued for rebroadcast, or if certain areas of the broadcast did not receive a complete signal, for example. The message from the vehicle 121 may include some information (e.g. location where broadcast was received, signal strength of broadcast, etc.) that is sent to the server 113 to aid in determining what steps should be taken next.

If there is a match, then the vehicle 121 can use the second portion of the content, also received from the server at 315, to reassemble the content for processing at 327. If the content was scrambled before breakup by the server 113, the vehicle 121 may know how to unscramble the content in a predefined manner that is not broadcast. In another example, the server 121 may include some indication of how to unscramble the content, for example, if there are five possible procedures the server used to scramble the content, the response message could tell the vehicle which pre-stored procedure to use to unscramble the content. This may work if a singular means of unscrambling is not determined to be sufficiently secure. In still another example, the response from the server can include a partial instruction, for example, the vehicle 121 may have general instructions to swap every Nth bit of content part 1 with every Mth bit of content part 2 and repeat until Y bits are swapped (the fact that a swap will occur being known to the vehicle) and the response from the server could include instructions as to the values of N, M and Y. Note, these are not the actual instructions for reassembling content, but rather illustrative examples to show various possible security paradigms.

Figure 4:
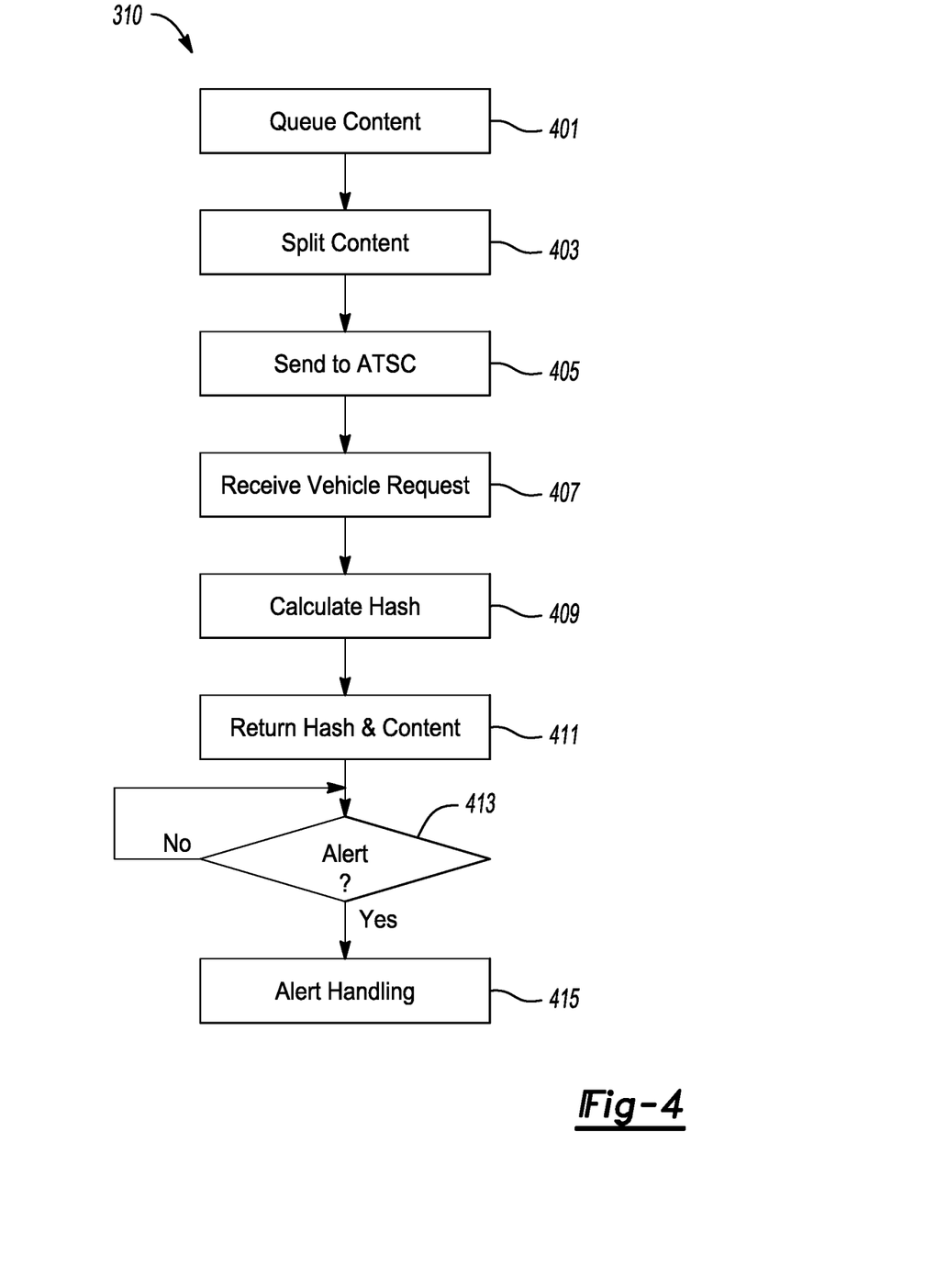
FIG. 4 shows an illustrative server-side verification process.

FIG. 4 shows an illustrative server-side verification process. In this process, the server 113 first receives content (e.g., an update) that is needed for delivery to a plurality of vehicles expected or known to be within an ATSC broadcast region. The server 113 breaks the content into at least two parts at 403, an example of which is shown with respect to FIG. 6. A larger portion is sent by the server 113 for ATSC broadcast (e.g., is sent to the ATSC server with delivery instructions at 405). Since the server 113 may employ a non-apparent strategy in breaking the content, simply having either piece of the content may not even allow someone to understand the piece in their possession. Because of encryption, bit swapping and other randomization techniques, each piece of content may essentially be meaningless or unusable without its counterpart.

At some point after the content has been broadcast via ATSC and received by at least one vehicle 121, the vehicles 121 will begin to request verification of the content. If the server 113 receives such a request and has instructed no content for broadcast, then the server may reject the validity out of hand. On the other hand, the content may have been sent some time before, and so the server may receive at least some indicator of what the content allegedly corresponds to. Because the content will still need to match any content at the server, in order to derive the hash, even if a hacker spoofed a content header to match a real content header, the ultimate hashing function at the vehicle 121 would return an incorrect result and so the vehicle 121 would still reject the content.

In this example, the server 113 receives the nonce from the vehicle 121 as part of the request. Since each vehicle 121 generates its own nonce, in this example, only the vehicle 121 and server 113 now both know the nonce. The server 113 also knows which vehicle 121 sent the request, so the server 113 can obtain the VIN for that vehicle 121 (e.g., via database lookup). Finally, the server 113 has a complete version of part 1 of the content, which it can use along with the VIN and nonce to generate a hash at 409. If a vehicle, knowing its own VIN and own nonce, were to attempt the hashing function with the same content, then the same result would be obtained, and therefore validity would be confirmed. If the vehicle had the wrong VIN, wrong nonce, or invalid content, the hashes would not match, and so the vehicle 121 would know that for one reason or another, there was an issue and the content could be discarded.

Theoretically, a person receiving the content with malicious intent may be able to spoof a message to the server, pretending to be a vehicle 121 with a VIN known to the hacker, and providing a nonce, and thus could receive a response including the second portion of the message. But even then, the hacker would have to know how to reassemble the content, which may not be a straightforward joining of the content. Further, these measures are illustrative of values that are known to the server and vehicle and do not exhaustively represent the values that could be used in instances of such a procedure.

The server 113 sends back at copy of the hash at 411, along with the second portion of the content. If the vehicle 121 experiences an error in processing the content, the server may receive an alert at 413 and may engage an alert handling process at 415. Otherwise, the server 113 may assume that the vehicle has handled the content successfully.

The alert handling process is not described in great detail, but could include, for example, resending the larger content for ATSC broadcast if too many vehicles 121 unexpectedly report errors, sending the content to one or more additional ATSC stations if insufficient vehicles appear to be receiving the content, rescheduling broadcasts, contacting the ATSC station to determine if there are broadcast errors, waiting for interference to clear, etc. The server may also divide the larger content into multiple small pieces, and assign each small piece a sequence number and set the total number of small pieces. Thus, even a vehicle doesn't receive all of small pieces via broadcast, it can still use received small pieces to request verification from the server.

FIG. 5 shows an illustrative vehicle-side verification request process. In this example, the vehicle 121 receives the content part 1 at 501. This is received via the ATSC tuner, for example, but the vehicle 121 may not be able to actually confirm that the content was intended for the vehicle 121 (based on the content alone) and was from the OEM and was not otherwise malicious in nature. In order to avoid malicious content, the vehicle 121 may generate the nonce at 503 and request that the server 113 verify the content at 505, which can include sending a copy of the nonce and any other necessary information directly to the server 113 over the cellular network or other direct connection (e.g., Wi-Fi).

Once the server 113 completes its portion of the verification process, such as the example shown in FIG. 4, the vehicle 121 receives a response at 507. In this example, the response could be an alert from the server that the content is invalid, or could be the hash and/or the second portion of the content.

If the response includes an alert at 509, such as a message that the content was never intended for delivery or no content was intended for delivery, then the vehicle 1212 can discard the content at 510. Otherwise, if there is supposed to be content having been received by the vehicle 121, as indicated by receipt of a hash and/or second content portion, the vehicle 121 can use its own nonce, VIN and content portion 1 to calculate its own version of the hash at 511. The vehicle 121 compares the two hash values at 513, the one received from the server and the one calculated by the vehicle 121, and if the values match at 515, the vehicle 121 concludes that the content must be valid.

If the values do not match, then the vehicle 121 either received false content or received a portion of content including some number of errors. Even if the vehicle 121 was supposed to have received content, the content received could still have been nefarious. In either event, however, the vehicle 121 will likely discard the content at 523, because the hash did not match and since the VIN and nonce were known and constant, the content must have been the source of the mismatch. The vehicle 121 may also alert the server at 525, so that the server can take any necessary mitigation action.

If there is a match, the vehicle 121 combines the second portion of content received from the server 113 with the existing larger portion of content at 517. The combined content is decrypted at 519 (these steps could occur in either order) in accordance with a decryption schema as previously described herein, or the like. The completed, decrypted content is then processed by the vehicle 121 at 521 to update the ECU or other module or software, or take any other necessary action as dictated by the content.

There are a variety of ways that the vehicle and server can coordinate to reassemble the content in ways that prevent a nefarious actor from spoofing the hash request in order to receive the second content portion. Even though a vehicle may disregard content that comes back invalid as a result of the hash comparison, a hacker would already have a known likely complete portion of content in possession and would not actually care about the hash, but really just wants to spoof the function to receive the second portion of content. The hacker may still send a nonce in any event, to ensure the portion one is complete, however even if the hacker can penetrate the fairly secure communication channels between the server and vehicles, several impediments may still exist.

First, a hacker will not likely know the particular hash function, or may not even know a format for a random nonce that the server will accept, although theoretically the hacker could intercept a message in order to simply copy a nonce. Nonetheless, without the hash function the hacker cannot compare results in order to validate the content. Further, even if the hacker assumed the content portion was valid, the hacker could not easily reassemble the second portion of the content with the first, unless they were simply to be appended. As noted herein, there are a number of ways to make such reassembly difficult, and so an OEM can remain reasonably assured that the content will be verified when correctly received, discarded when erroneous or unverifiable, and will not likely be utilized by anyone without sufficient permissions to do so.

Figure 6:
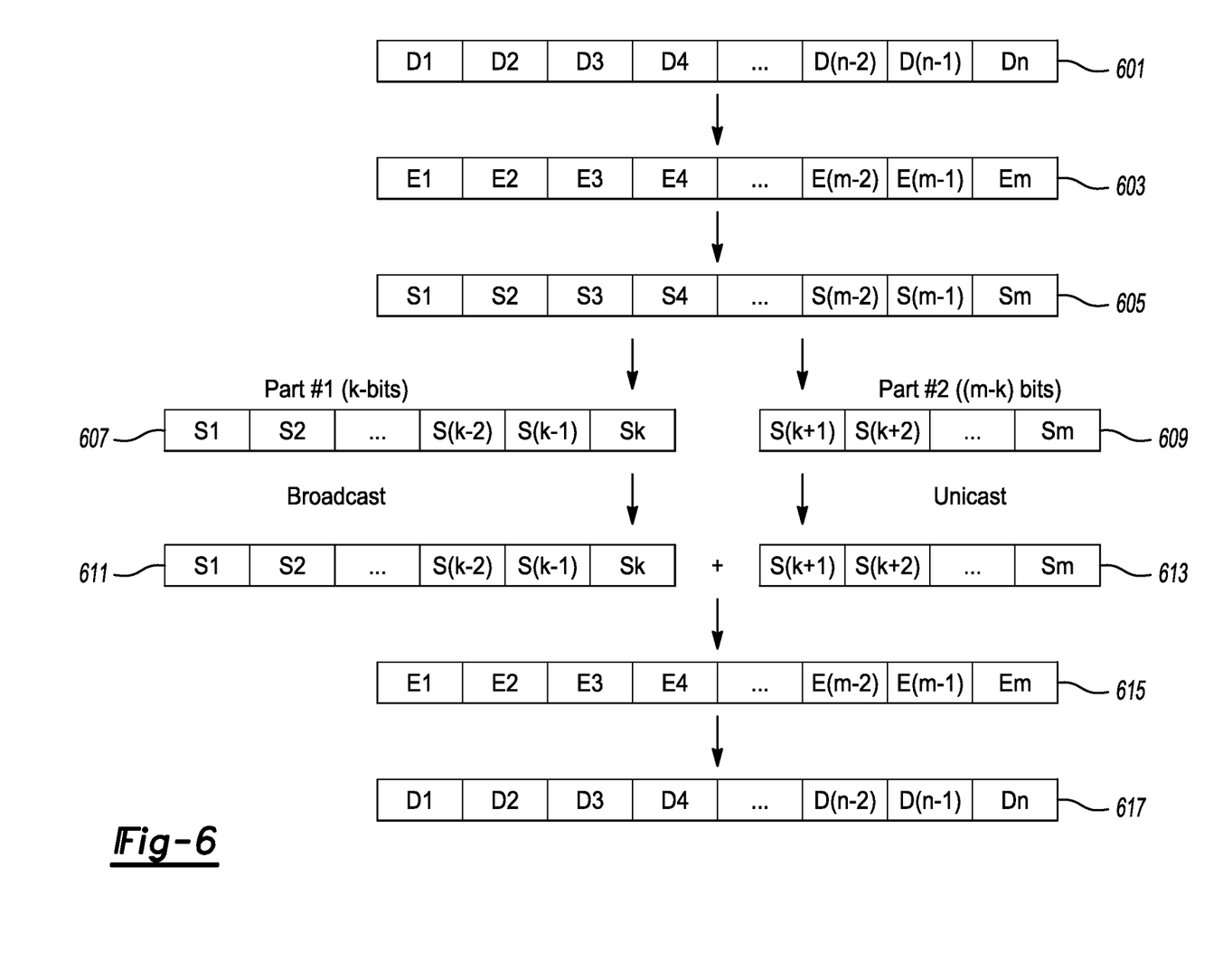
FIG. 6 shows an illustrative data evolution throughout an illustrative process.

FIG. 6 shows an illustrative data evolution throughout an illustrative process. This is a mere example of how content can be divided strategically in a manner that makes it difficult, or impossible, for an intercepting party to reassemble the content without sufficient knowledge of the initial division and encryption process.

In this example, D1-Dn bits of content 601 exist in the original form of content received by the server 113 for delivery. This could be an update, a secure message or anything else the OEM wants to deliver to vehicles at scale. Again, this can be a very large file and ATSC may thus be reasonable for delivering a large portion of the large file at a very low data overhead cost via broadcast.

Next, in this example, the server 113 encrypts the content into m bits E1-Em 603. In this example, the content is still in whole form, but is encrypted. The server 113 then scrambles the content in some manner, so that while m bits still remain, the bits are now out of order in order S1-Sm 605. Thus, in order to reassemble the content, even from this portion, someone would need to know both how to unscramble and decrypt the content to resolve the original n bits.

The sever then breaks the content into k bits and m-k bits, with a larger portion in this example being the k bits S1-Sk 607 and the smaller portion being the remaining S(k+1)-Sm bits 609. The server 113 then sends the S1-Sk bits 611 to the ATSC station 101 for broadcast and reserves the S(k+1)-Sm bits 613 for direct transmission to vehicles 121 requesting verification of the received S1-Sk bits.

When the vehicle 121 has both portions, the vehicle 121 can reassemble the content by appending the two portions (or taking other suitable action, e.g., interleaving or any other known approach). This combined portion of content is still scrambled and encrypted, and so even so-assembled it is largely useless to a hacker. Since the vehicle 121 knows how the server 113 scrambled the bits, the vehicle 121 can then unscramble the bits to have a correct version of the encrypted m bit message E1-Em 615. Again though, this is still an encrypted message.

Then, the vehicle 121 can use a known decryption scheme corresponding to the encryption scheme used by the server 113 to resolve the m encrypted bits into the original n bit message D1-Dn 617.

The illustrative embodiments allow for message verification, preventing malicious or erroneous message handling, message encryption/assembly without interception, and generally allow for ATSC, which may not be a particularly secure format in general, to be used to facilitate transfer of high security messages. While all elements of the solution, or comparable variants thereof, need not be used in a given implementation, they present a number of options and guidance for how to reduce data overhead costs to utilize ATSC while avoiding concerns about the security of information sent thereby.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a memory, storing at least instructions;
a processor in communication with the memory and that, when executing the instructions, is configured to:
receive a first portion of content via an ATSC broadcast, wherein the first portion is part of at least a first and second portion of content, split by a remote server prior to transmission of the first portion;
responsive to receiving the first portion of content, generate a random nonce;
send a request for content verification to the remote server, the request including the random nonce;
receive a message from the remote server indicating that the first portion of content is valid, wherein the message includes the second portion of the content and a first hash value;
responsive to the message indicating that the content is likely valid, calculate a second hash value, using the random nonce and the first portion of content as inputs to a hashing function;
compare the second hash value to the first hash value;
responsive to the second hash value matching the first hash value, combine the second portion of content and the first portion of content to create combined content;
utilize a security strategy to convert the combined content into utilizable content; and
utilize the utilizable content.

2. The system of claim 1, wherein the processor is further configured to calculate the second hash using a vehicle identification number as further input to the hashing function.

3. The system of claim 1, wherein, responsive to the message indicating that the content is invalid, the processor is configured to discard the content.

4. The system of claim 1, wherein, responsive to the second hash value not matching the first hash value, the processor is configured to alert the server to the mismatch.

5. The system of claim 1, wherein the processor is configured to utilize a security strategy including unscrambling bits of the combined content in a predefined manner.

6. The system of claim 5, wherein the processor is configured to use one or more variable elements received in the response to resolve variables in the security strategy to formulate a complete unscrambling process usable to unscramble the content.

7. The system of claim 1, wherein the processor is configured to utilize a security strategy including unscrambling bits of the combined content and decrypting the combined content.

8. The system of claim 1, wherein the first portion of content is one of a plurality of first portions of content and includes an indicator as to which of the plurality of first portions it corresponds to and an indicator of a total number of the plurality of first portions.

9. The system of claim 8, wherein the processor is configured to combine the content according to a predefined combination strategy using one or more variable elements received in the response to resolve variables in the combination strategy to formulate a complete combination process usable to combine the content.

10. A system comprising:
a memory, storing instructions;
a processor in communication with the memory and that, when executing the instructions, is configured to:
reconfigure deliverable vehicle content according to a security strategy to derive reconfigured content;
divide the reconfigured content into a first and second portion;
send the first portion to an ATSC broadcast station;
receive a verification request from a vehicle to verify receipt of the first portion at the vehicle, the request including a nonce generated by the vehicle;
verify whether the vehicle was designated for content receipt;
responsive to the vehicle being designated for content receipt, generate a hash value using the first portion of the reconfigured content and the nonce; and
send the hash value along with the second portion of content to the vehicle in response to the verification request.

11. The system of claim 10, wherein the processor is further configured to generate the hash value based on a vehicle identification number associated with the vehicle.

12. The system of claim 10, wherein, responsive to the vehicle not being designated for content receipt, the processor is configured to alert the vehicle to the presence of unintended content.

13. The system of claim 10, wherein the processor is configured to reconfigure the deliverable vehicle content by scrambling the deliverable vehicle content according to a predefined scrambling strategy.

14. The system of claim 13, wherein the predefined scrambling strategy includes at least one variable scrambling element, and wherein the processor is configured to generate a scramble variable value for the scrambling element and include the scramble variable value in the sending to the vehicle in response to the verification request.

15. The system of claim 10, wherein the processor is configured to divide the content according to a predefined division strategy including at least one variable division element, and wherein the processor is configured to generate a division variable value for the division element and include the division variable value in the sending to the vehicle in response to the verification request.

16. The system of claim 10, wherein the processor is further configured to:
  divide the reconfigured content into a plurality of first portions;
  include, with each of the plurality of first portions, an ordered indicator indicating an ordering for each of the first portions, as well as a total number of the plurality of first portions; and
  send the plurality of first portions to the ATSC broadcast station, each of the plurality including the ordered indicator and total number.

\* \* \* \* \*